3,096,161
HEAT SETTING OF BINDER OF FIBROUS MASSES
Albert R. Morrison and José A. Apellániz, Newark, Ohio, assignors to Owens-Corning Fiberglas Corporation, a corporation of Delaware
Filed Sept. 16, 1957, Ser. No. 684,042
7 Claims. (Cl. 34—1)

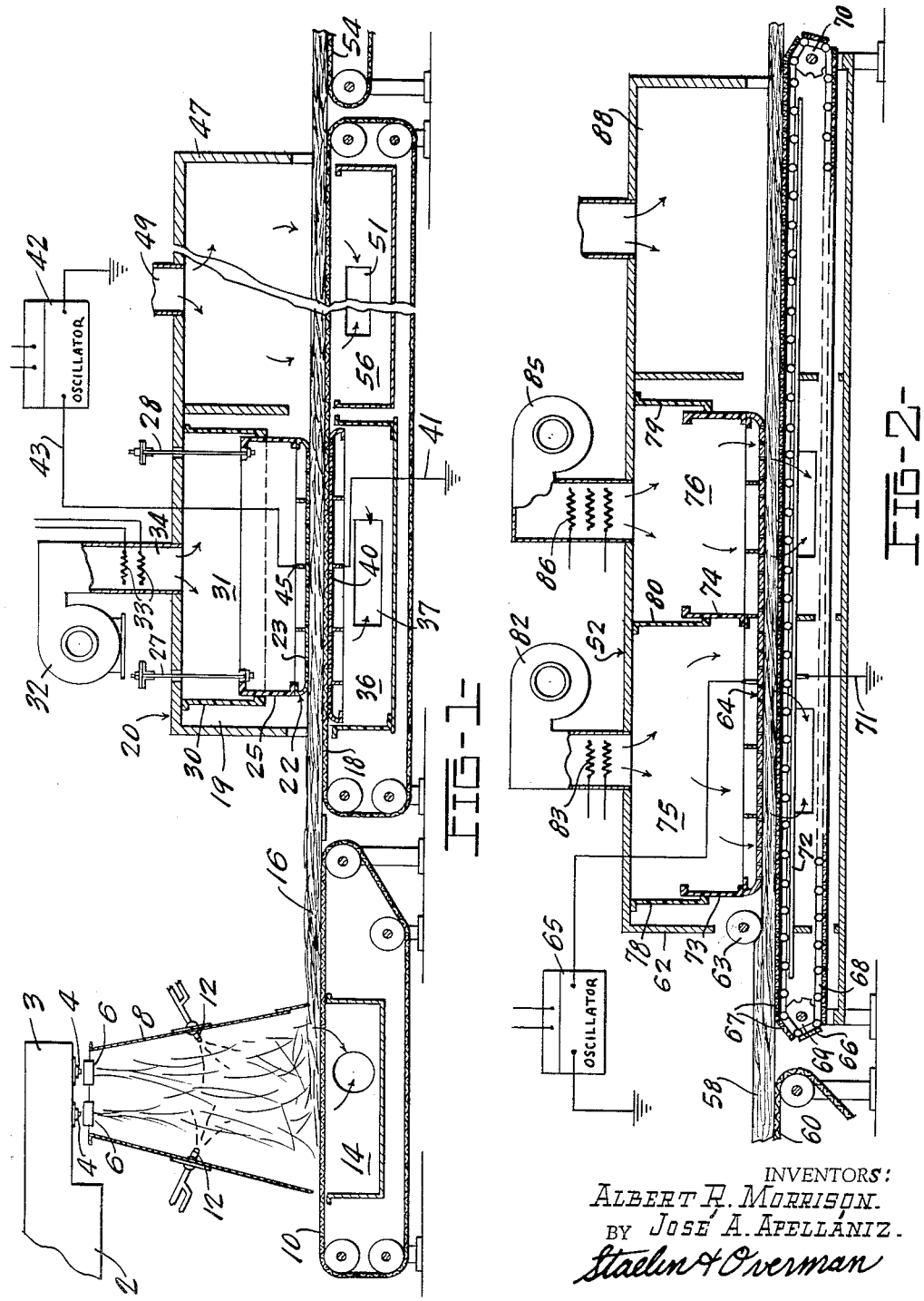

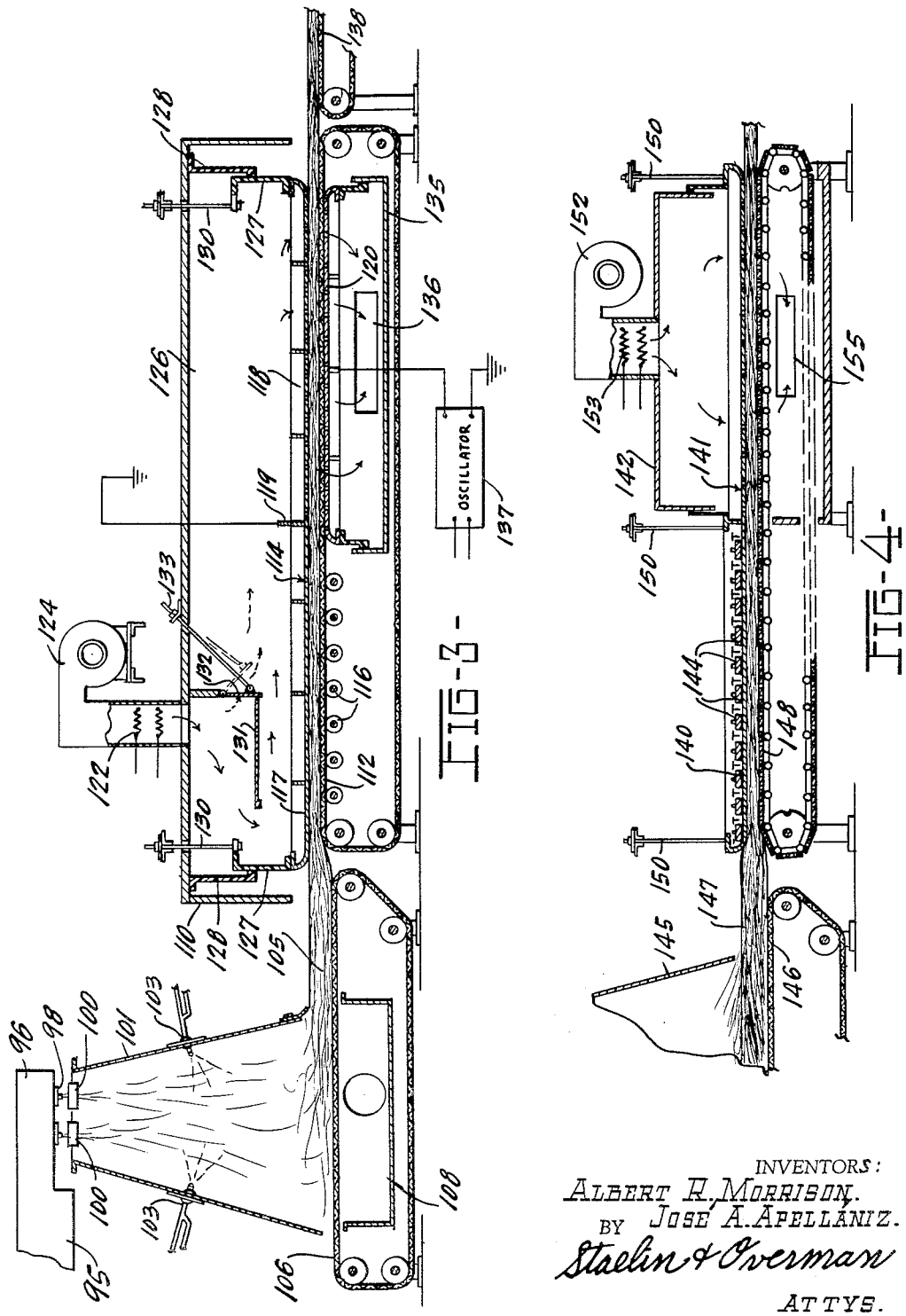

This invention relates generally to methods and apparatus for setting or curing heat activated binders of fibrous masses. The invention pertains primarily to the curing of the binding agent of such masses through the use of dielectric heating, and additionally to the curing of the binding agent in separate steps, including that of a preliminary removal of volatile vehicles of the binding agent.

The methods and apparatus of the invention have special utility in setting packs of mineral wool and are herein illustrated and described in connection with the processing of fibrous glass packs or webs.

Glass fibers are produced by a number of well-established systems, all using blasts of air, steam or combustion gases to attenuate fine streams of molten glass into thread-like fibers having diameters ranging from three to one hundred, hundred thousandths of an inch.

For textile purposes the fibers may be of continuous lengths or formed into strands from staple lengths varying between eight to sixteen inches. In the production of glass wool, from which batts, rolls and boards are fabricated and to which this invention pertains, the fibers in lengths generally averaging less than eight inches are collected in a fleecy mass upon a conveyor moving across the bottom of a glass fiber forming hood. When it is desired to integrate the resultant fibrous mass a heat settable binder, such as phenol formaldehyde, is dispersed among the fibers as they are gathered on the conveyor. The final product may retain the low density of the original pack or may be compacted to semi-rigid or rigid form.

Such masses of fibrous glass have superior qualities for thermal insulation and sound absorption because of the minute conductive paths at contact points between the cylindrical fibers and the multitude of air cells between and thin air layers around the fine fibers. This exceptional inherent resistance to the penetration and conduction of heat has been an obstacle in connection with the heat setting or polymerization of the preferred resin binders, such as the phenols and ureas.

A phenol formaldehyde resin binder, which has had wide use for this purpose, polymerizes in a matter of seconds upon reacting a curing temperature between 300° and 350° Fahrenheit. However, this binder is generally introduced in an aqueous solution and the removal of the water by vaporization consumes a great amount of heat and must precede the application of the final heat increment which raises the basic resin constituent to the required temperature.

A very effective arrangement for curing the binder of fibrous glass packs, involving the forced movement of hot air through the packs, has been in use for some years in the production of a vast quantity of such products. Soaking heat applications in static hot air ovens, although slower, have also been used with success. Both methods are time-consuming when considering the operation as a whole, from the formation of the glass fibers through the packaging of the final product. They also require curing ovens of extensive length.

By utilizing air heated well above the actual curing temperature, the curing time required is decreased. However, there is a limit to such forced heating as temperatures above 450° may cause charring or punking of the binder. This use of higher temperatures also aggravates the unbalanced condition wherein the outer layers are apt to be overcured before the inner portion reaches a curing temperature.

With the conventional hot air curing of fibrous glass packs there may be quite a range in the amount of cure given the dispersed particles of the binder. This may be due to various factors including a difference in density between portions of the pack, more water associated with some binder particles than with others, and the temperature gradient between the exterior and interior sections.

Through this lack of uniform setting the full binding power of which the binder is capable is not secured, and the strength of the batt, board or other final product is quite below what it would be with proper curing.

Considerable study has been directed to the possibilities of dielectric heating for attaining a more perfect curing action. This has seemed a likely solution in view of the successful employment of this heating means for setting the resin adhesives between laminae of plywood and creating uniform heat interiorly of other products structurally resistant to heat penetration.

However, the difficulties attending the adaptation of a dielectric heating system to a glass wool production line have so far proved a considerable barrier to those striving to reach this objective.

The glass wool is generally processed on continually moving conveyors and is often under compression when being transported through binder curing zones. The binder distribution may not be uniform and may have more or less of a water constituent. Also, the density of the pack is greater in some areas than in others. Accordingly, the pack is not truly homogenous and its dielectric response to charged electrodes is irregular. Then too the glass fiber packs are produced in various thicknesses. These, as well as the particular antipathy of glass wool to heat reception and conduction, are complicating factors which must be dealt with when attempting to use dielectric heating methods for this fibrous product.

It is a principal object of this invention to provide a method and apparatus utilizing dielectric heating for drying and curing the binder in moving masses of thermal insulating fibrous masses.

A further object of the invention is the provision of a binder curing arrangement in which dielectric heating and hot air are used together.

Another object of the invention is to provide means for compressing a traveling mass of fibrous glass while it is subjected to dielectric heating.

A still further object is the provision of dielectric heating electrodes which are ported for the passage of hot air.

Another object of the invention is to effect a uniform drying of the binder particles before the application of a curing temperature.

It is also an object of this invention to employ air flow to retard curing of drier particles of a binder while dielectric heating is utilized to volatilize the liquid vehicle more heavily associated with other portions of the binder.

A supplemental object is to provide means and methods for preliminary setting of the binder adjacent the surface of a mass of fibrous glass before subjecting the mass to curing heat.

It is an additional object of the invention to precure a surface layer of the traveling fibrous pack against a stationary plate before it is submitted for full curing to a stream of hot air and dielectric heating.

Another object is the provision of a stationary curing plate along and against which the fibrous pack is conveyed, the first portion of the plate being imperforate and the final section being air permeable.

Yet another object is to provide means for facilitating the initial compression of a moving fibrous pack against a stationary curing plate.

These and other objects and advantages of the invention will be more apparent upon reading the following description with reference to the accompanying drawings in which:

FIGURE 1 is a schematic, elevational, sectional view of a glass fiber forming hood and curing for an uncompressed pack, embodying one form of this invention;

FIGURE 2 is a like presentation of a curing oven embodying an alternate form of this invention in which a glass wool pack is cured while under compression;

FIGURE 3 is a schematic longitudinal section of a glass fiber pack production line embodying another form of the invention; and FIGURE 4 is a like view of a pack curing zone in which a stationary curing plate is positioned exteriorly of a hot air curing oven.

Referring to the drawings in more detail, the glass wool production equipment of FIGURE 1 begins with the glass melting tank 2, from the forehearth 3, of which, the molten glass flows in fine streams out orifices in bushings 4. The threads of glass are drawn downwardly and attenuated by air or steam jets from manifolds 6 into fibers, of a diameter preferably between fifteen and thirty, hundred thousandths of an inch for products to which this invention relates.

As the fibers fall within hood 8 toward the receiving conveyor 10, intermingled therewith are discrete particles of an uncured binding agent, preferably a phenol formaldehyde resin in an aqueous solution. The binder solution is projected among the falling fibers by air atomizing nozzles 12 extending through the walls of hood 8. The glass fibers impregnated with the binder collect in a pack upon the pervious, receiving conveyor 10, assisted by the suction chamber 14 into which air is drawn down through the conveyor.

The fibrous glass web or pack 16 thus formed commonly has a width of four feet and a thickness ranging up to eight inches or more as controlled by the speed of the conveyor and the production rate of the fibers, the thickness being selected to fit the specifications of the final product.

The continuous pack 16 is advanced upon receiving conveyor 10 for delivery to the following foraminous conveyor 18. The latter is a woven wire belt, but may be of open weave fabric or perforated belting, for instance, of silicone rubber composition.

In the processing of the pack as depicted in FIGURE 1, dielectric heating is utilized in drying the binding agent, and the curing of the binder is effected with the pack in an uncompacted state. Within the first section 19 of the curing oven 20 is a combination stationary skid plate and electrode 22. Its lower portion is a heavy aluminum sheet 23 faced with hard chrome plating. The alumiuum composition is desirable because of its high electrical conductivity while the chrome is necessary to withstand the abrasive action of the moving fibers. A copper beryllium alloy would also have suitable toughness and conductive properties. Integral with the skid plate and electrode 22 and forming vertical extensions of its upturned edges is an annular partition 25 of insulating material. Hanger rods 27 and 28 suspend the electrode 22 and its upward partition 25 at the necesasry height to accommodate the fibrous pack being processed. The rods are adjustable through nuts threaded to their upper ends and which rest on stationary brackets.

The annular partition 25 has a sliding fit within a depending wall member 30 to form an air chamber 31. Into this chamber air is directed by blower 32 past heating elements 33 and through inlet 34. This heated air travels downwardly through ports in electrode 22 into and through the glass fiber pack to reach the suction chamber 36 from which it is exhausted through outlet 37. The upper side of the suction chamber 36 is defined by the ported electrode 40 which is grounded at 41. The electrode also serves as a support for the woven wire conveyor 18. In view of its functioning as a conveyor support as well as a capacitor plate, electrode 40 should also be chrome plated aluminum or a copper beryllium alloy.

A dielectric heating field is established within the moving pack by applying to electrode 22 a high frequency charge which reaches it from an oscillating current source 42 through lead wire 43. The latter preferably has a connection 45 at the center of the electrode to reduce frequency-induced voltage fluctuations. This is particularly desirable when the electrode has a length of twenty feet or more as is recommended for an installation such as here involved.

A frequency of 13 megacycles has proved suitable for purposes of this invention. Other frequencies in the range between 7 and 27 megacycles should also give quite satisfactory results. For a most expeditious curing action a voltage of 6000 to 8000 per inch of spacing or gap between electrodes is preferred. There should, however, regardless of spacing distance, be an upper limit of 15,000 volts to avoid spark-over and corona discharge.

Following the first dielectric heating section 19 of the oven 20 is a second final curing section 47. Heated air in this section has direct access to the traveling pack. The air, at a temperature above that of the air utilized in section 19, arrives through inlet 49 and after passing down through the pack and the pervious conveyor 18 is drawn into the discharge outlet 51 of suction chamber 52.

In the operation of the apparatus of FIGURE 1 the pack 16 of resin impregnated glass fibers is for example two inches in thickness with a density of a pound and a half per cubic foot as delivered by conveyor 16 to the foraminous conveyor 18. Should it be desired to produce from this pack an uncompressed glass wool blanket, the electrode 22 is positioned two inches above conveyor 18 to permit the pack pass freely therebetween. For purposes of this discussion of the functioning of this embodiment, the distribution of the resin in aqueous solution among the glass fibers is uneven with some spots of the binder containing more water than do others. The water content may be as high as fifty percent. As the pack travels between electrodes 22 and 40 the high permittivity of the moisture laden spots concentrates dielectric field lines therethrough and a greater share of the heating energy of the field is directed to the volatilization of such water.

As 540 calories are consumed in transforming one gram of water to steam compared to the six tenths of a calorie needed to raise one gram of water one degre Fahrenheit and the still smaller fraction of a calorie to raise one gram of the pure resin one degree, it may be estimated, in connection with a binder spot containing fifty percent water, that at least ten times as much heat as required to volatilize the water than to raise the resin component to a curing temperature.

Another point to consider is that the binder spot does not go over boiling temperature until the moisture is entirely removed therefrom. Because of this heavy requirement of heat, the high refraction of the dielectric lines of force to the moisture laden spots serve the important function of applying more of the heat energy to areas where it is most needed.

However, with dielectric heating alone some lines of force naturally pass through comparatively dry particles of binder, and bring them to a curing temperature of 300 to 350° Fahrenheit before moisture is entirely removed from other binder particles or spots. It is in retarding this early dielectric curing of a portion of the binder, that the flow of air may be used most advantageously. For this purpose the air directed into the first section 19 of the oven by blower 32 is preferably heated to a temperature around 230° Fahrenheit.

The air accordingly acts to draw heat away from binder particles going above this temperature and curbs their tendency to reach a curing level. At the same time the air being slightly above the water boiling point of 212° F. assists the dielectric field in volatilizing the water from moisture laden partciles of binder.

Another valuable function of the air stream passing down through the fibrous pack is to elongate the binder spots vertically. The rather stratified structure of the fibrous mass is inclined to hold the larger particles of binder in horizontal planes. These are not so receptive of the dielectric lines of force as are more vertically extending globules or particles. For this reason the vertical elongation effected by the air flow increases the application of heating energy to the water carrying spots. As such spots are more fluid, they are more susceptible to disruption and vertical displacement by the force of the moving air.

In additional ways the flow of air aids the dielectric removal of moisture. Without the forced air flow, water vapor would move sluggishly away from the water laden spots and would retard continued volatilization. By carrying away the water vapor, the air movement eliminates this retarding effect. Also the heated air warms the electrodes and thereby keeps the vapor from condensing on them.

The apparatus of FIGURE 1 is particularly adapted to level out the dryness of binder particles in the first oven section 19 through the combined action of the dielectric heating arrangement and of the air heated below curing temperature. The uncompressed pack is then subjected to a flow of air at 450° or 500° F. in the final section 47 to complete the polymerization of the resin binder. The velocity of this air stream should be gauged to avoid disruption of the pack and should probably not exceed one hundred feet per minute. From oven section 47 the cured blanket is transferred to a subsequent conveyor 54 upon which it may be given a paper envelope, cut to length, and rolled for shipment.

While the pack is described as uncompressed while traveling beneath the skid plate 22 of the apparatus of FIGURE 1, a precompression roller such as 63 of FIGURE 2, may be utilized to level out the pack and ease its entry beneath plate 22.

In the apparatus of FIGURE 2 dielectric heating is employed for both drying and curing the binder. The oven 52 of FIGURE 2 receives a pack 58 from the forming hood conveyor 60. The pack is here intended to be utilized in a compressed product such as an insulating board. It may have an original thickness of six inches reduced to an inch and a half under compression. At the entrance to the first section 62 of the oven 56 the pack is passed under a precompression roller 63 to prepare it for entry beneath the combination skid plate and dielectric electrode 64 receiving current from oscillator 65. The electrode is preferably of highly conductive aluminum plated with scuff resistant chrome. In this presentation a heavy conveyor 66 carries the pack to withstand the pressure of compression. The conveyor has perforated cross panels 67 extending between roller chains 68 turning on sprockets 69 and 70 and supported in runways 72. The perforated upper electrode 64 has an upwardly extending annular partition 73 and center partition 74 forming two air chambers 75 and 76 with end wall members 78 and 79 and center wall member 80. The holes in cross panels 67 and electrode 64 are preferably one eighth of an inch in diameter with centers three sixteenths of an inch apart. Approximately the same port dimensions would be utilized in the perforated electrodes and skid plates of other embodiments disclosed in this application.

The air directed into the first chamber 75 by blower 82 is heated to only 230° F. by elements 83. This air passes down through electrode 64 and acts to prevent curing of the dry binder particles while water is removed from the moisture laden binder spots by the dielectric field established between electrode 64 and conveyor 66, the latter being grounded by wire 71 contacting runway 72.

After the moisture content of the compressed pack 58 has been removed through the dielectric heating beneath chamber 75 of the first oven section 62, the pack passes below the second chamber 76 of this oven section. While the dielectric action is the same here, the temperature of the air from the blower 85 is raised to 450° to 500° by the heavier electrical heating elements 86. This air in passing down through the terminal section of the skid plate electrode 64 cooperates with the dielectric heating to rapidly cure the binder to a point of setting. The time required for this partial curing is approximately thirty seconds. This curing portion of electrode 64 should be roughly as long as the moisture removing first part, which would be likely in the range of twenty to thirty feet.

With the dimensional stability of the pack thus established it is delivered to tunnel type oven section 88 where heated air has free access to the pack to rapidly complete the polymerizing curing of the binder. This takes less time than the presetting, requiring between five and twenty seconds depending upon the nature of the pack. The cured pack is then discharged to a following conveyor for subsequent treatment such as coating and cutting.

In connection with the first dielectric heating zone of the apparatus of FIGURE 2, the air serves in the same manner as with the oven of FIGURE 1, to curtail over heating of dry particles, add heat for assisting the evaporation of water, elongate spots of binder into vertical shapes more attractive to the lines of energy and carry away water vapor from the volatilizing spots.

In the second dielectric heating zone the more highly heated air cooperates with the dielectric heating to rapidly bring the full binder content to a setting state and makes the generation of heat more uniform by reaching points weakly affected by the dielectric field and drawing heat away from areas which may be overheated by a concentration of field lines. The air reaches more readily and more completely the areas of the pack of lower density which are least receptive to the dielectric heating effect.

The pack processing equipment of FIGURE 3 includes the conventional molten glass tank 95 from the forehearth 96 of which fine streams are discharged through orifices in bushings 98. Attenuating air or steam is projected from manifolds 100 in encompassing relation to the streams of glass. The fibers thus formed drop down within hood 101 and intermingle with particles of binder from spray nozzles 103. The fibers collect in a web or pack 105 on foraminous conveyor 106 assisted by the air drawn down into suction chamber 108.

The pack 105 formed on conveyor 106 is delivered for compression and curing to oven 110. The curved receiving end of a skid plate frequently marks the surface of a pack forced against and beneath it. For this reason the carrying surface of conveyor 106 is placed at a level below that of the open mesh fabric conveyor 112 upon which the pack is transported through oven 110. Through this arrangement and the projection of the skid plate 114 out beyond the beginning end of conveyor 112 the pack is compressed upwardly by conveyor 112 against the flat area of skid plate 114. This mitigates the first disrupting contact of the pack with the plate and the pack is not forced downwardly to a serious extent by the initial upward curve of the plate.

The belt conveyor 112 is held in horizontal alignment in the first part of oven 110 by a series of supporting rollers 116. The skid plate 114 is unique in having an initial imperforate section 117 and a terminal ported section 118. Through this integral construction there is no break in the compression of the pack between two curing steps. In previous arrangements the pack is released between a skid plate and a following compression flight or skid plate. This release, however brief, weakens the cohesive strength of the final product. The section 118 also acts through grounding connection 119 as half of the capacitor arrangement including electrode 120 by which a dielectric field is established in the passing pack. The high frequency electrode 120 is composed of aluminum which is chrome plated to provide a wear resisting bearing surface for the fabric conveyor belt 112.

Air heated by electrical elements 122 is driven into oven 110 by a blower 124. A fairly tight air chamber 126 is formed between skid plate 114 and the top of the oven by upward extensions 127 of the plate and depending walls 128 against which the extensions slide upon adjustment of the hanger rods 130. The heated air entering chamber 126 is first directed over the surface of the imperforate section 117 of the skid plate by a partition 131.

After thus heating section 117 the heated air proceeds rearwardly to flow downwardly through the holes in the perforated section 118 of the skid plate. The degree of contact of the hot air with the forward section and hence the degree of heating thereof may be varied by raising or lowering the swinging damper 132. This is accomplished through manual sliding movement of rod 133 which projects through the roof of the oven. A casing 135 forms with the charged electrode 120 a suction chamber, with outlet 136, for air passing downwardly from the perforated skid section 118.

In the operation of the embodiment of the invention presented in FIGURE 3, the compressed pack advancing upon conveyor 112 acquires a smoothly pressed surface cured to a set point through its contact with the heated imperforate section 117. The pack is then able to withstand without misshaping the high velocity air heated to a temperature between 450° and 500° Fahrenheit directed down through the following perforated section 118. The velocity of this air flow may be as high as two hundred feet per minute.

The pack for which this particular apparatus is adapted is one in which the dispersion of binder particles is more complete and the water component is present substantially to the same extent in all particles. Under these conditions the high frequency dielectric field established between skid plate section 118 and charged electrode 120 by current from oscillating source 137 acts equally upon all the binder component and heats them uniformly. With the supplemental heat provided by the hot air, rapid curing is accomplished. The pack then progresses to a following conveyor 138 for subsequent finishing operations.

The curing procedure for which the embodiment of FIGURE 4 is adapted is like that accomplished through the equipment of FIGURE 3. The principal difference resides in having the forward imperforate section 140 of the skid plate 141 externally of the oven 142 and heated by strip heaters 144. This is an economizing arrangement as the costly oven is considerably reduced in size. Another difference is that hot air without dielectric heating is relied upon to bring the binder to a set state following the development of a smooth, cured surface layer by the ironing effect of the imperforate skid portion 140.

As shown in FIGURE 4 the pack arrives from the forming hood 145 upon conveyor 146 by which it is delivered to the heavy panel type conveyor 148 and is compressed against the conveyor by skid plate 141. The latter is suspended upon hanger rods 150. The strip heaters 144 are placed crosswise of the upper surface of the plate including the upwardly curved forward end as it is important that this be adequately heated to prevent sticking of the tacky binder thereto. Instead of strip heaters other well known means, such as hot air or steam coils, gas burners, induction circuits, direct electrical current, or infra red lamps could of course be employed to bring the exteriorly extending portion of the plate to the proper temperature.

With the incrustation given the pack by the imperforate skid section, the pack is prepared to resist deformation by the high velocity heated air within oven 142 by which the binder in the balance of the pack is cured. The air blower 152 and electrical heating elements 153 are diagrammatically indicated as in the preceding views. The air after passing downwardly through the pack and conveyor is exhausted from the suction chamber through outlet 155.

Although the stationary skid plates of the apparatus of FIGURES 3 and 4 are shown above the conveyors carrying the packs, it has been found that they may be positioned facing upwardly with a conveyor flight above them for propelling the fibrous pack. However, in regard to the feature disclosed in FIGURE 3 involving the compression of the pack from the opposite side against the skid plate at a point beyond the beginning edge of the plate, reversal of the plate might require upper and lower conveyor flights for proper delivery of the pack to execute this technique.

While air has been referred to herein as the heat transfer medium, steam is quite equally effective, although of a more dangerous nature. Where the term "air" appears in this description and in the following claims it should, accordingly, be interpreted sufficiently broadly to encompass steam.

Certain specific temperatures have been cited in the explanation of the operation of the various embodiments. These should be considered as those presently preferred, but it should be realized that the variable specifications of the glass wool stock and the different proportions of the binder component may require different temperatures. For instance with some packs final heat of 500° F. will cause charring or punking of the binding agent.

However, for general purposes, an air temperature between 200° and 250° F. should be suitable for functioning with dielectric heating for drying binder particles; a temperature between 400° and 450° F. is recommended for effecting the presetting or B-stage curing of the crust or full thickness of a pack; and a temperature between 450° and 500° F. is considered best for bringing the resin binder to full polymerization or the final C-stage of reaction.

Reference to air velocities herein has been somewhat general, instead of specific, because of the wide range of velocities permissible with different glass wool stocks. For instance, a raw pack four inches thick, of a pound and a quarter per cubic foot density, may be able to withstand, without deformation, an initial velocity of only twenty-five feet per minute, while a pack of the same thickness, but twice the density, will resist deformation under air flow at double that velocity. After preliminary setting, of either a skin layer or the full thickness, the allowable increase in velocity may be as much as three hundred percent, for example, from thirty to one hundred and twenty feet per minute.

In recapitulation, the principal features of this invention include methods and apparatus utilizing the combination of air and dielectric heating for removing volatile constituents of binders for fibrous masses; the use of such a combination for presetting or fully curing binding agents; electrodes ported for the passage of air; means for compressing fibrous packs traveling through a dielectric field; a curing skid plate with an imperforate first section and an air pervious following section; a skid plate exterior of a following curing oven; and an arrangement for minimizing the pack disrupting effect when a traveling pack first contacts a stationary curing plate.

It should be apparent from the preceding that adequate means have been provided to attain the objects and advantages of the invention initially cited as well as those referred to in the preceding description. More complete and faster curing results from the singularly cooperative action of dielectric heating and heated air. The ported electrodes and the arrangement of conveying the compressed packs through the dielectric field contribute to the successful blending of the two heating agencies. The skid plate having integral imperforate and perforate sections produces packs structurally improved and at a high rate. The technique of delivering a pack upwardly against the flat area of a skid curing plate decreases the marking which attends a straight projection of the pack against the curved starting edge of the plate.

We claim:

1. A method of heat curing the moisture laden binder of a porous, fibrous mass, in which the temperature required for heat curing the binder is substantially above the volatilizing temperature of the moisture, comprising first drying the binder by placing the mass in a dielectric heating field and simultaneously driving air at a temperature below the heat curing temperature of the binder through the mass, and then driving air at a binder heat curing temperature through the mass.

2. A method of drying liquid bearing particles of the heat-setting binder of a porous mass without materially setting the binder, in which the liquid has a volatilizing temperature not exceeding 212° F. and the setting temperature of the binder is substantially higher than 212° F., comprising submitting the mass to a dielectric heating field and simultaneously directing air through the mass, maintaining said air at a temperature in a range between a low of 212° F. and a high approaching but below the setting temperature of the binder, the latter being at least 300° F., whereby the full energy of the dielectric field is utilized in volatilizing the liquid and so drying the particles, but is opposed by the temperature of the air from raising particles of the binder to a setting temperature.

3. Apparatus for curing the heat reactive binder of a fibrous web including a moving, air pervious carrier for the web, a smooth surfaced, stationary plate, means so supporting the plate adjacently above the path of the carrier that the upper side of the web is brought into moving contact with the plate, said plate being elongated along the path of the carrier and being imperforate in its first portion and perforate in a subsequent portion, means heating the first portion of the plate and means forcing heated air into the web through the subsequent portion.

4. Apparatus for curing the heat reactive binder of a fibrous web according to claim 3 in which the means heating the first portion of the plate includes means for directing the heated air later forced through the subsequent portion of the plate over the surface of the first portion of the plate.

5. Apparatus for curing the heat reactive binder of a fibrous web according to claim 3 in which the means heating the first portion of the plate is electrical.

6. Apparatus for curing the heat reactive binder of a fibrous web according to claim 6 in which the carrier holds the web compressed against the plate while the web is in moving contact therewith.

7. Apparatus for curing the heat reactive binder of a compressed fibrous web including a first conveyor upon which the web is first carried, said conveyor traveling in a substantially horizontal plane and having a web receiving end and a web delivery end, a second conveyor traveling in a horizontal plane above that of the first conveyor, said second conveyor having a receiving end arranged to receive the web from the delivery end of the first conveyor, an elongated, flat surfaced curing plate, means applying binder curing heat to the plate, and means supporting the plate above and in parallel relation to the second conveyor with a portion of the plate projecting back beyond the web receiving end of the second conveyor, said second conveyor being so spaced from the plate that the web is brought upwardly and compressed against the plate by the second conveyor as the web is received thereon from the first conveyor and after the web has moved under the projecting portion of the plate.

References Cited in the file of this patent

UNITED STATES PATENTS

| | | |
|---|---|---|
| 894,070 | Schwerin | July 21, 1908 |
| 1,626,766 | Tompkins | May 3, 1927 |
| 2,231,457 | Stephen | Feb. 11, 1941 |
| 2,288,072 | Collins | June 30, 1942 |
| 2,491,687 | Nutt | Dec. 20, 1949 |
| 2,493,194 | Heino | Jan. 3, 1950 |
| 2,500,690 | Lannan | Mar. 14, 1950 |
| 2,576,519 | Kopp | Nov. 27, 1951 |
| 2,612,462 | Zettel | Sept. 30, 1952 |
| 2,635,352 | Phillips | Apr. 21, 1953 |
| 2,658,848 | Labino | Nov. 10, 1953 |
| 2,698,488 | Cannon et al. | Jan. 4, 1955 |
| 2,737,569 | Brown et al. | Mar. 6, 1956 |
| 2,746,894 | Orser et al. | May 22, 1956 |
| 2,779,848 | Bosomworth et al. | Jan. 29, 1957 |

FOREIGN PATENTS

| | | |
|---|---|---|
| 495,737 | Belgium | Sept. 1, 1950 |
| 1,033,104 | France | Apr. 1, 1953 |